US011093900B1

(12) United States Patent
Benjamin

(10) Patent No.: US 11,093,900 B1
(45) Date of Patent: Aug. 17, 2021

(54) EMPLOYMENT EXCHANGE FOR FACILITATING EXCHANGES OF VERIFIED EMPLOYMENT CANDIDATES BETWEEN OFF-BOARDING EMPLOYERS AND ON-BOARDING EMPLOYERS

(71) Applicant: Thomas P. Benjamin, Forest Hills, NY (US)

(72) Inventor: Thomas P. Benjamin, Forest Hills, NY (US)

( * ) Notice: Subject to any disclaimer, the term of this patent is extended or adjusted under 35 U.S.C. 154(b) by 303 days.

(21) Appl. No.: 16/169,666

(22) Filed: Oct. 24, 2018

Related U.S. Application Data

(60) Provisional application No. 62/582,387, filed on Nov. 7, 2017.

(51) Int. Cl.
  *G06Q 10/10* (2012.01)
  *G06Q 10/06* (2012.01)

(52) U.S. Cl.
  CPC . *G06Q 10/1053* (2013.01); *G06Q 10/063112* (2013.01)

(58) Field of Classification Search
  None
  See application file for complete search history.

(56) References Cited

U.S. PATENT DOCUMENTS

| | | |
|---|---|---|
| 7,437,309 B2 | 10/2008 | Magrino et al. |
| 8,660,871 B2 | 2/2014 | Vianello |
| 2003/0177052 A1 | 9/2003 | Smith, III et al. |
| 2003/0182171 A1* | 9/2003 | Vianello ............ G06Q 30/0273 705/7.14 |
| 2013/0282606 A1* | 10/2013 | Bhagat ............... G06Q 10/1053 705/321 |
| 2014/0207508 A1 | 7/2014 | Faulkner |
| 2014/0279634 A1 | 9/2014 | Seeker |
| 2014/0317008 A1 | 10/2014 | Wilner et al. |

(Continued)

OTHER PUBLICATIONS

F. Siraj, N. Mustafa, M. F. Haris, S. R. M. Yusof, M. A. Salahuddin and M. R. Hasan, "Pre-selection of Recruitment Candidates Using Case Based Reasoning," 2011 Third International Conference on Computational Intelligence, Modelling & Simulation, 2011, pp. 84-90, doi: 10.1109/CIMSim.2011.24. (Year: 2011).*

*Primary Examiner* — Lynda Jasmin
*Assistant Examiner* — Laura Yesildag
(74) *Attorney, Agent, or Firm* — Goldstein Law Offices, P.C.

(57) ABSTRACT

An employment exchange for facilitating the transfer of verified candidates between an off-boarding employer and an on-boarding employer, comprising an outplacement tracking module, a requirement tracking module, and a placement tracking module. The outplacement tracking module verifies the identity of a user, such as an employer or a candidate, before the user can register with the employment exchange, and further ensures that each candidate is an active job seeker whose employment is terminated by an off-boarder. The requirement tracking module allows an on-boarder to post job requisitions and hire candidates, and allows a candidate to apply to job requisitions. The placement tracking module tracks the status of a placement offer extended by an on-boarder to a candidate to verify that the placement is completed.

17 Claims, 9 Drawing Sheets

(56) References Cited

U.S. PATENT DOCUMENTS

2015/0310394 A1* 10/2015 Shanmugasundaram ....................
................................................................ G06Q 10/1095
................................................................ 705/7.19
2018/0232703 A1* 8/2018 Chuang ............ G06Q 10/06311
2019/0019160 A1* 1/2019 Champaneria .......... G06F 40/30

* cited by examiner

EMPLOYMENT EXCHANGE FOR FACILITATING EXCHANGES OF VERIFIED EMPLOYMENT CANDIDATES BETWEEN OFF-BOARDING EMPLOYERS AND ON-BOARDING EMPLOYERS

CROSS-REFERENCE TO RELATED APPLICATIONS

This application is a nonprovisional utility application of provisional patent application, Ser. No. 62/582,387, filed in the United States Patent Office on Nov. 7, 2017, claims priority therefrom, and is expressly incorporated herein by reference in its entirety.

TECHNICAL FIELD

The present disclosure relates generally to a system and a method for facilitating an employment exchange. More particularly, the present disclosure relates to an employment exchange where on-boarding employers may directly recruit verified employment candidates from off-boarding employers.

BACKGROUND

Employment websites are vital in connecting employers with employment candidates. Candidates can search, view, and apply to countless job listings, while employers can search and browse through resumes and profiles of thousands of potential employment candidates. However, the vast numbers of job listings and resumes present on job sites are generally not checked to ensure that the listings are still active, or that the candidates who posted their resumes are still looking for employment. Recruiters and employers may reach out to promising candidates through their resumes, only to be rebuffed or ignored by candidates who are no longer seeking new employment. Similarly, active job seeking candidates may submit applications to dozens of job listings, unaware that these listings represent positions that have already been filled. As a result, these candidates may never receive any responses to their applications, which can leave candidates feeling demoralized. Furthermore, most job sites do nothing to verify the identities of candidates or employers. Job seekers may therefore run the risk of submitting potentially sensitive information to dubious entities which are merely harvesting resumes, while employers are required to undertake extra effort to screen applicants before devoting the time and effort to interview or evaluate them. Employers and job applicants may turn to recruiters in their effort to find vetted candidates and job opportunities, but recruiters do not provide the breadth of results and the convenience of a typical job site.

There is a need therefore for an employment exchange which overcomes these disadvantages through mechanisms which ensure that every potential candidate is an active job seeker, and that every active job listing represents an actual unfilled job opening, combining the convenience of an internet based job site with the vetted opportunities normally provided by recruiters.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an employment exchange for facilitating exchanges of verified employment candidates between an off-boarding employer and an on-boarding employer. Accordingly, the present disclosure provides an employment exchange comprising an outplacement tracking module which verifies the identity of an employer as well as the identity of a candidate. The employment exchange further comprises a requirement tracking module which allows a candidate to search for and apply to a job requisition, and which further allows an on-boarder to search for candidates who can fill a job requisition of the on-boarder. The employment exchange also comprises a placement tracking module, which tracks the status of a placement offer extended by the on-boarder to the candidate, allowing the employment exchange to verify that the placement offer is successfully completed. The employment exchange further comprises an employment exchange data repository which stores a candidate database, an employer database, a job requisition database, and a placement offer database.

It is another aspect of an example embodiment in the present disclosure to provide an employment exchange where each candidate has a verifiable need to seek employment. Accordingly, the outplacement tracking module can be configured to allow a candidate to register with the employment exchange only with the approval of the off-boarding employer who has, or is in the process of terminating the candidate's employment. Furthermore, any candidate who has accepted a placement offer from an on-boarder may be prevented by the employment exchange from applying to any further job requisitions, and may become hidden to other on-boarders, preventing the candidate from being recruited by other on-boarders.

It is a further aspect of an example embodiment in the present disclosure to provide an employment exchange where each active job requisition represents an actual open position which an on-boarder seeks to fill. Accordingly, each job requisition may have a hiring target representing the number of candidates the on-boarder wishes to hire for the job requisition. Once the number of candidates hired by the on-boarder for the job requisition matches the hiring target, the job requisition becomes inactive and the employment exchange will prevent further candidates from applying for the job requisition.

It is yet a further aspect of an example embodiment in the present disclosure to provide an employment exchange which is capable of accessing employment data stored on an employer human resource information system (HRIS) in order to verify the identity of a candidate or track the status of a placement offer. Accordingly, the employment exchange may be configured to access the employer HRIS via a custom API which enables the employment exchange to retrieve employment data using database queries.

The present disclosure addresses at least one of the foregoing disadvantages. However, it is contemplated that the present disclosure may prove useful in addressing other problems and deficiencies in a number of technical areas.

Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
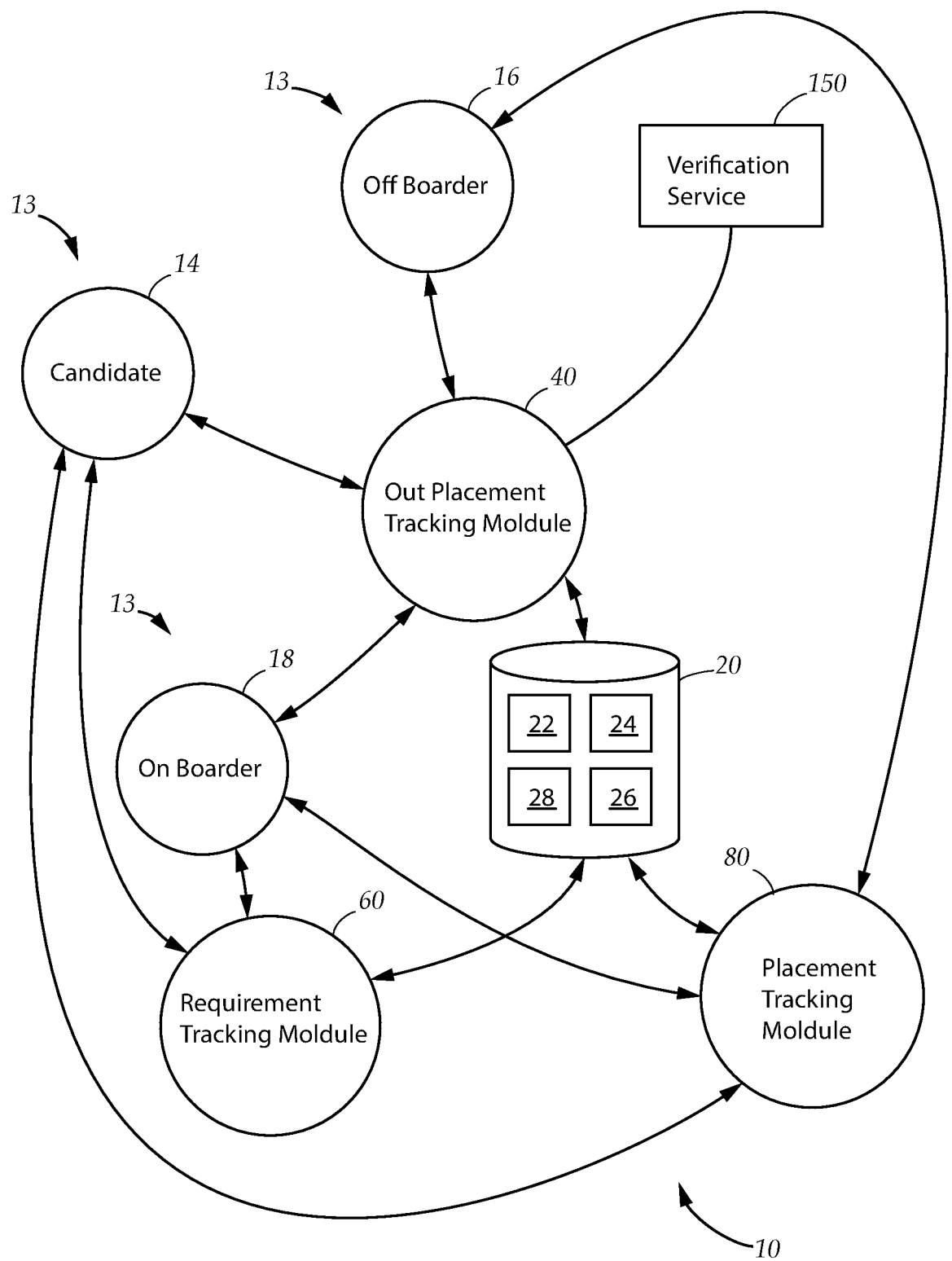
FIG. 1A is a block diagram depicting an exemplary employment exchange comprising an outplacement tracking module, a requirement tracking module, a placement tracking module, and an employment exchange data repository, in accordance with the present disclosure.

FIG. 1A illustrates an exemplary employment exchange 10 for facilitating exchanges of verified employment candidates between off-boarding employers and on-boarding employers, comprising an outplacement tracking module 40, a requirement tracking module 60, a placement tracking module 80, and an employment exchange data repository 20. The employment exchange data repository 20 stores employment data comprising employee information, employer information, job requirement information, and placement information. Users of the employment exchange 10 comprise at least one of an off-boarder 16, a candidate 14, and an on-boarder 18. An employer which has either terminated, or is planning to terminate the employment of its employees can submit a registration request to the employment exchange 10 to register as an off-boarder 16. The outplacement tracking module 40 receives the request from the off-boarder 16 and verifies the identity of the off-boarder 16 via an employer intake process. During the employer intake process, the off-boarder 16 supplies employer information which will be used to verify the identity of the off-boarder, such as a combination of address, EIN, DUNS, business registration number, or other identifying information. The employer information may then be referenced using a verification service 150, which can include EIN lookup services provided by government agencies or third parties, or an automated business verification service. Once the identity of the off-boarder 16 is verified, the outplacement tracking module 40 creates an employer data record associated with the off-boarder 16, which can be indexed within an employer database stored within the employee exchange data repository 20. Once the off-boarder 16 has successfully registered with the employment exchange, the off-boarder 16 may register any of its current or terminated employees with the employment exchange 10 as a candidate 14. The outplacement tracking module 40 processes the registration of the candidate 14 via a candidate intake process, and may further verify the identity of the candidate using employee information supplied by either the off-boarder 16 or the candidate 14. For example, the outplacement tracking module 40 may reference the candidate's Social Security Number (SSN) using a government or third party SSN verification service. Once the identity of the candidate 14 is verified, the outplacement tracking module 40 creates a candidate data record associated with the candidate, which may be indexed in a candidate database 22 stored within the employment exchange data repository 20. The candidate data record contains employee information, such as a unique ID generated by the employment exchange 10 which uniquely identifies the candidate 14, and candidate profile data which can describe the candidate's personal information, qualifications, and experience, such as resume information, as well as other relevant items of information. The profile data may further include that candidate's contact information, such as the candidate's address, phone number, and email address. The candidate data record may further indicate the candidate's availability for employment. The candidate 14 may also submit a candidate registration request independently of the off-boarder 16, but the candidate will not be registered unless the candidate's employer, acting as the off-boarder 16, confirms that the candidate is an employee of the off-boarder whose employment has been, or is scheduled to be terminated. By allowing only verified employees of an off-boarder to be registered as candidates, the employment exchange 10 ensures that each candidate has an active need to seek employment. Furthermore, the unique ID may be derived from the candidate's SSN or a combination of the candidate's employee information items which uniquely identifies the candidate, preventing the candidate from registering with the employment exchange more than once in order to create duplicate candidate data records.

An employer wishing to fill a job opening can submit a registration request to the employment exchange 10 to register as an on-boarder 18. The outplacement tracking module 40 receives the request from the on-boarder 18 and initiates the employer intake process as described above. Once the identity of the on-boarder 18 is verified, the outplacement tracking module 40 creates an employer data record associated with the on-boarder 18 which may be indexed within the employer database 26. Once the on-boarder 18 has successfully registered with the employment exchange 10, the on-boarder 18 may then make a job requisition submission representing an available job opening. The job requisition submission is received by the requirement tracking module 60, which then creates a job requisition data record associated with the job requisition. Each job requisition data record is then indexed within a job requisition database 24 stored in the employment exchange data repository 20.

The requirement tracking module 60 allows the candidate 14 to search the job requisition database 22 for job requisitions, and to submit a job requisition application for a particular job requisition. The requirement tracking module 60 then allows the on-boarder 18 to view the candidate profile of the candidate 14 submitting the job requisition application, and to be placed in contact with the candidate at the on-boarder's option. For example, the employment exchange 10 may allow the candidate 14 and the on-boarder 18 to communicate via messages on the employment exchange 10, or may allow the on-boarder 18 to view the candidate's contact information to initiate direct contact. If the on-boarder 18 wishes to hire the candidate 14, the on-boarder 18 may extend a placement offer to the candidate 14. The placement tracking module 80 creates a placement offer record associated with the placement offer which can be indexed within a placement database 28 stored in the employment exchange data repository 20. If the candidate accepts the placement offer, the placement tracking module 80 then initiates a placement tracking procedure to track the transfer of the candidate's employment from the off-boarder 16 to the on-boarder 18. The placement tracking module 40 may track the placement offer to determine whether the placement offer is successful or unsuccessful, by determining when one or more placement conditions are met, such as the release of the candidate 14 by the off-boarder 16 and the transfer of the candidate's employment to the on-boarder 18, and may further request confirmation from the candidate 14 regarding whether the transfer of the candidate's employment to the on-boarder 18 is complete. Once the placement conditions are met, the placement offer is marked as successful, and the placement tracking module 80 edits the candidate data record of the candidate 14 to indicate the candidate is no longer available for employment, preventing the candidate 14 from submitting further job requisition applications for other job requisitions. If the candidate 14 has received more than one placement offer, any other pending placement offers can be marked as unsuccessful and will be withdrawn.

The on-boarder 18 may also search the candidate database for candidates who are available for employment. The on-boarder 18 may submit a job requisition request, based on an existing or new job requisition, to the candidate 14 via the requirement tracking module 60. If the candidate 14 accepts the job requisition request, the requirement tracking module 60 can place the candidate 14 in contact with the on-boarder 18. If the on-boarder 18 wishes to hire the candidate 14, the on-boarder may send a placement offer to the candidate 14 via the employment exchange 10, which will then be submitted to the placement tracking module 60 for further processing as described above.

Each job requisition may further have a hiring target stored within its job requisition data record, which indicates how many candidates may be hired to fill the job requisition before the hiring target is met, causing the requirement tracking module 60 to prevent further candidates from submitting job requisition applications to the job requisition. This allows the employment exchange 10 to ensure that all active job requisitions represent available job openings, preventing candidates from wasting their time submitting applications to a job requisition submitted by an on-boarder who is no longer hiring additional candidates.

Figure 1B:
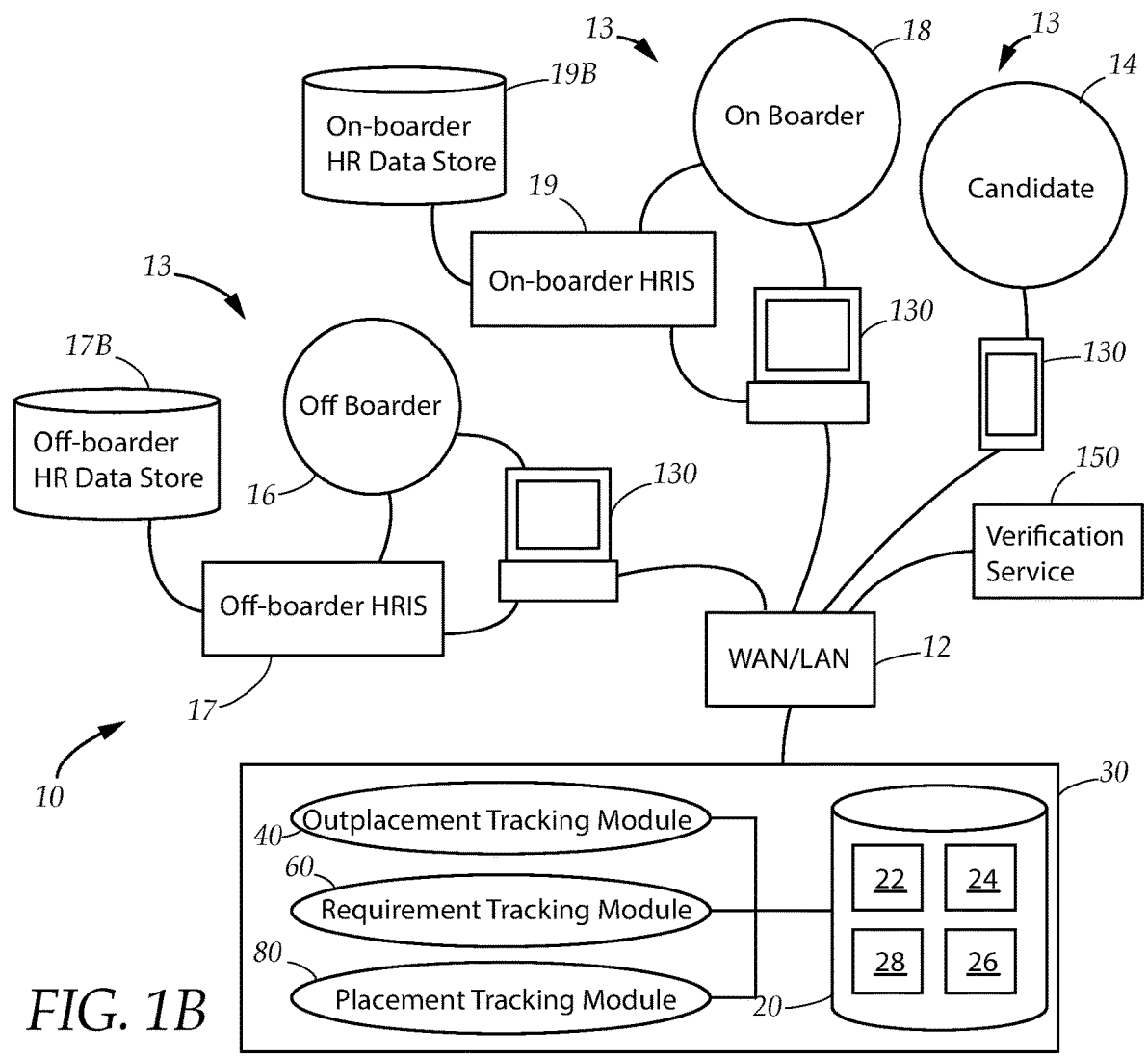
FIG. 1B is a block diagram depicting an exemplary system on which the employment exchange is implemented.
Figure 1C:
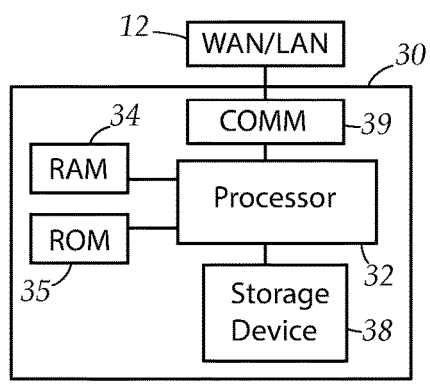
FIG. 1C is a block diagram depicting an exemplary employment exchange control server, in accordance with the present disclosure.

Turning now to FIG. 1B-C, the employment exchange comprises an employment exchange control server 30, which implements the functions of the employment exchange 10, including the outplacement tracking module 40, the requirement tracking module 60, and the placement tracking module 80. The employment exchange control server 30 comprises a processor 32, a RAM 34, and a ROM 35, and may further comprise a storage device 38 and a communications module 39. The storage device 38 stores the employment exchange data repository 20, while the communications module 39 enables the employment exchange server to communicate via a WAN or a LAN environment 12. The employment exchange 10 may further comprise additional employment exchange control servers, and the various functions of the employment exchange 10 can be distributed across each of the employment exchange control servers. For example, each employment exchange control server 30 may implement the functions of one, or a combination of, the outplacement, requirement, and placement tracking modules 40, 60, 80.

Figure 1D:
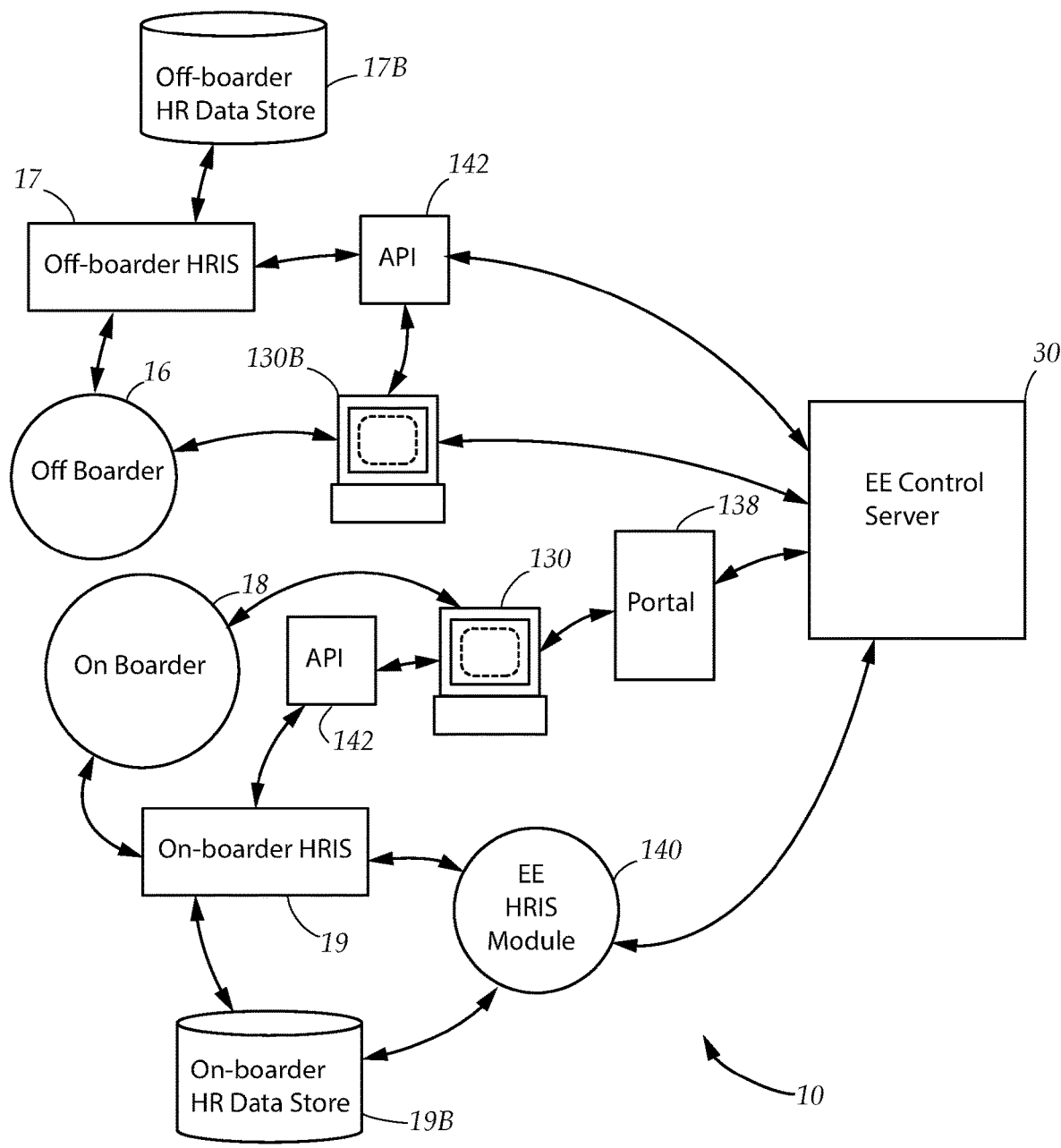
FIG. 1D is a block diagram depicting the flow of communications within the employment exchange, in accordance with the present disclosure.

The users 13 may connect to the employment exchange 10 via the WAN or LAN 12, representing both internet-based and local users. Each user 13 may connect to the employment exchange 10 via a user terminal 130 such as a personal computing device such as a PC, smartphone, tablet, or other suitable computing device capable of communicating over the WAN or LAN 12 and further equipped with a display and an input device. Turning to FIG. 1D, while continuing to refer to FIGS. 1B-C, the user terminal 130 may connect to the employment exchange 10 via a portal 138, which can be implemented as a web portal providing each user with access to the features of the employment exchange 10. Each user may also access the employment exchange 10 through a client application enabled user terminal 130B running a client application which provides access to the features of the employment exchange 10. The employment exchange 10 may further be adapted to communicate with an employer's human resource information system (HRIS), including an off-boarder HRIS 17 or an on-boarder HRIS 19, in order to access employment data. The off-boarder HRIS 17 and the on-boarder HRIS 19 further comprise an off-boarder HR data store 17B and an on-boarder HR data store 19B respectively for storing employment data. The employment exchange 10 may communicate with an HRIS using an application programming interface (API) 142 to retrieve employment data via database query and other standard database commands. The employee exchange 10 may employ a custom employment exchange API, an API associated with the HRIS, or a combination of both, to facilitate the transfer of employment data between the employer HRIS and the employment exchange 10. Similarly, the user terminal 130 and client application enabled terminal 130B may be configured to communicate with an HRIS via the API 142. The employment exchange 10 may further comprise an employment exchange HRIS module 140 which can be integrated with the off-boarder or on-boarder HRIS 17, 19, allowing direct access between the employer HRIS and the employment exchange 10, facilitating communications between the employment exchange 10 and the on-boarder and/or off-boarder HR data store 17B, 19B as well as access to the features of the employment exchange 10. Interactions between the employer HRIS and the employment exchange 10 may be authenticated and secured using a variety of methods which will be apparent to a person of ordinary skill in the art in the field of the invention. In the exemplary embodiment depicted in FIG. 1D, the employment exchange control server 30 communicates with the off-boarder HRIS 17 via the API 142 facilitating the transfer of employment data between the off-boarder HR data store 17B and the employment exchange server. The off-boarder 16 may access the employment exchange 10 via a portal 138 using the off-boarder's user terminal 130. The on-boarder HRIS 19 is integrated with the employment exchange HRIS module 140, allowing the employment exchange 10 to directly access the on-boarder HR data store 19B as well as allowing the on-boarder 18 to access the features of the employment exchange 10 directly through the on-boarder HRIS 19. This example is non-limiting, and each user may opt to connect to the employment exchange using a user terminal 130 via the portal 138 or a client application enabled user terminal 130B, and the employment exchange HRIS module 140 may be configured on the on-boarder HRIS 19 and/or off-boarder HRIS 17.

Figure 2:
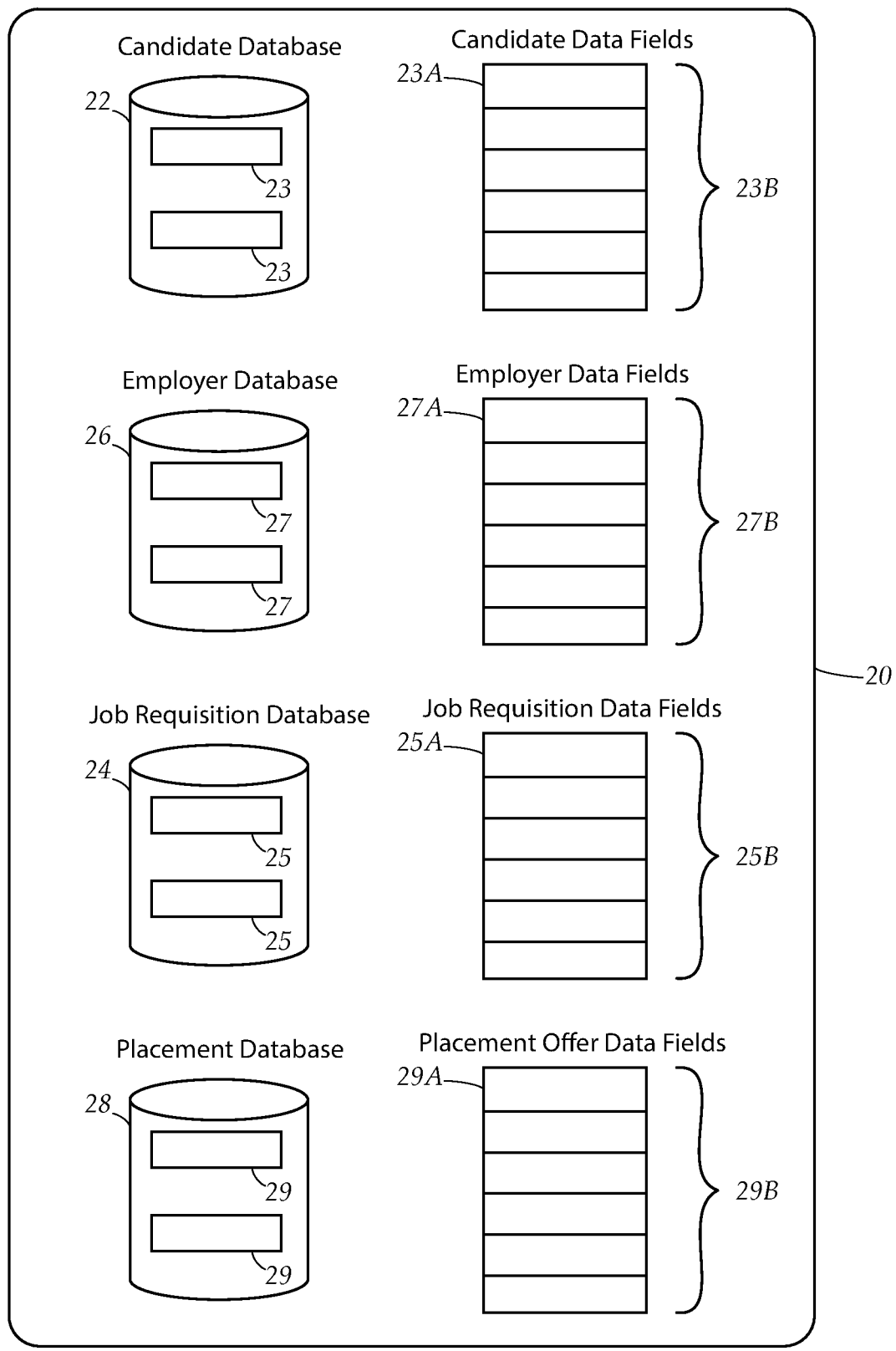
FIG. 2 is a block diagram depicting an exemplary employment exchange data repository and an exemplary arrangement of the databases stored within the data repository, in accordance with the present disclosure.

Turning to FIG. 2, the candidate database 22 may comprise a plurality of candidate data records 23 with each candidate data record 23 associated with a specific candidate. Each candidate data record 23 comprises a plurality of candidate data fields 23A. Employee information 23B can be stored using one or more candidate data fields within the plurality of candidate data fields 23A. In addition to the unique ID and the profile data, the candidate data record 23 may contain further employee information items, such as a visibility attribute which indicates how much of the candidate's employee information is visible to other users. The visibility attribute may comprise anonymous, invisible, selectively visible, and visible attributes. The anonymous attribute may allow other users to view items of employee information within the candidate's profile data which do not reveal the candidate's identity, such as the candidate's general location, experience, qualifications, or other similar employee information. The invisible attribute may prevent the candidate's employee information from being viewed by the on-boarder. For example, candidates who are unavailable for employment may be automatically assigned the invisible visibility attribute. The selectively visible attribute may allow the candidate's employee information to be visible to on-boarders with whom the candidate is in contact regarding a job requisition application or job requisition request. The visible attribute may allow the candidate's profile data to be visible to all on-boarders.

The employer database 26 may comprise a plurality of employer data records 27, with each employer data record 27 associated with one specific employer. Each employer data record 27 stores employer information within a plurality of employer data fields 27A. The employer data record 27 may further indicate whether the employer is an off-boarder or an on-boarder. In some embodiments, an off-boarder may simultaneously act as an on-boarder.

Each job requisition data record 25 within the job requisition database 24 contains at least one job requisition data field 25A. Each job requisition data record 24 may contain a job requisition ID identifying the job requisition associated with the job requisition data record, job requisition parameters which describe the qualifications and requirements for the job requisition, pay and benefits, location, and other relevant information describing the job requisition, and an on-boarder employer ID identifying the on-boarder who submitted the job requisition. The job requisition data record may further contain the hiring target as described earlier in the present disclosure.

Each placement offer record 29 within the placement database 28 contains at least one placement offer data field 29A. The placement offer record 29 may contain a candidate ID identifying the candidate receiving the placement offer, an off-boarder ID identifying the employer who is terminating the candidate's employment, and an on-boarder ID indicating the on-boarder who extended the placement offer to the candidate. The placement offer record may further contain a placement status indicating whether the candidate accepts the placement offer, whether the off-boarder releases the candidate, whether the on-boarder completes the placement, and whether the placement offer is ultimately successful or unsuccessful.

Note that this example is intended to be non-limiting, and the employment exchange data store 20, and the databases and data records stored within, may be implemented using any commonly employed database format and arrangement of tables, records, and fields, in adherence with the principles of the present disclosure, as will be appreciated by a person of ordinary skill in the art in the field of the invention.

Figure 3:
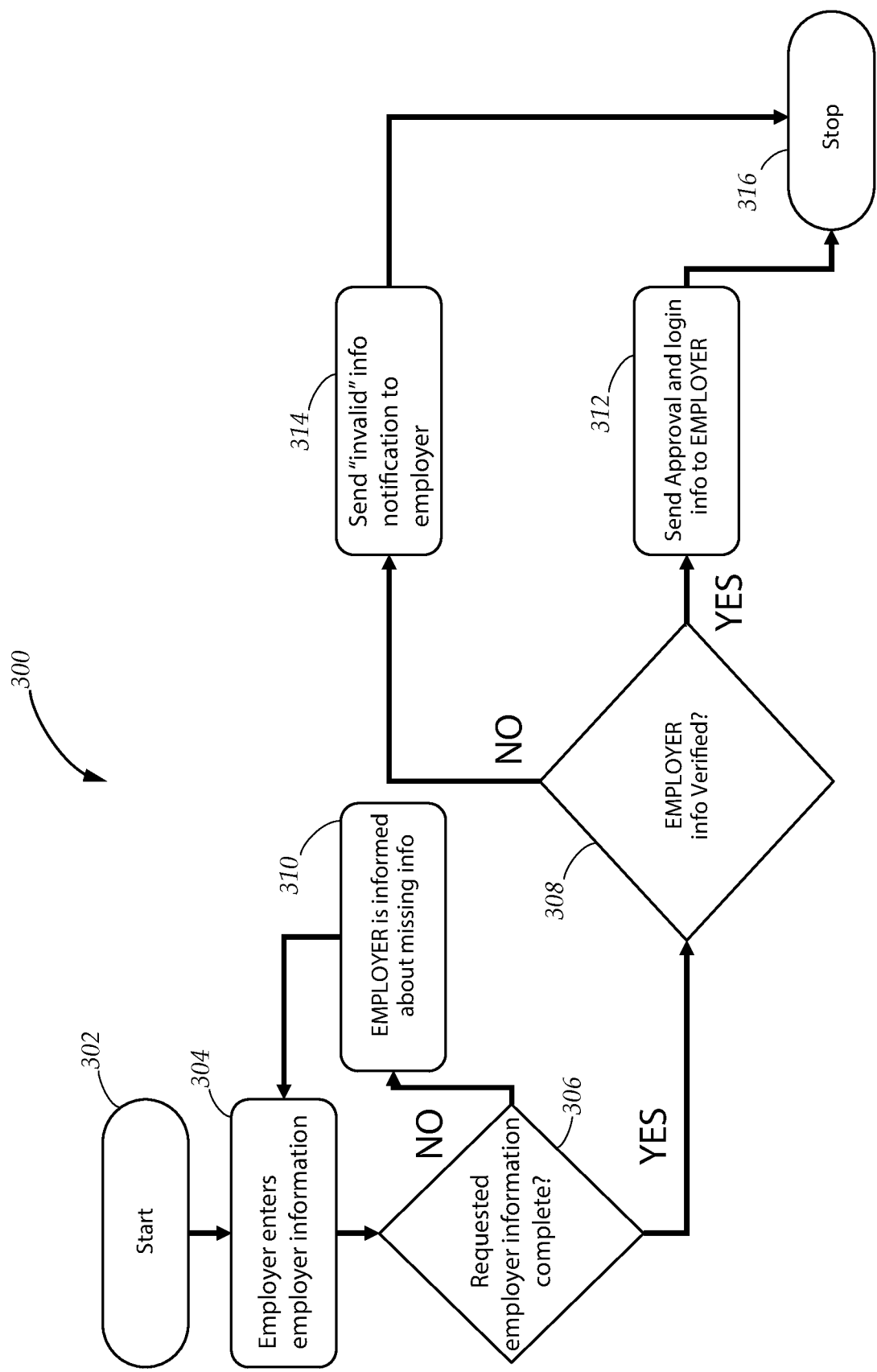
FIG. 3 is a block diagram depicting a process flow for an exemplary employer intake process, in accordance with the present disclosure.

Turning now to FIG. 3 while referring simultaneously to FIGS. 1A-B, 1D, and FIG. 2, an exemplary implementation of the employer intake process 300 begins at step 302 where an employer submits a registration request to the employment exchange 10. The employer may be either an off-boarder, or an on-boarder. In a preferred embodiment, the outplacement tracking module 40 receives the registration request from the employer, and requests employer information from the employer at step 304. The requested employer information may include a combination of address information, Federal Tax ID Number (EIN), Dun & Bradstreet DUNS Number, business registration number, or other identifying information. The employer may submit the requested employer information via the portal 138 or via the client application. The outplacement tracking module 40 confirms if the employer information submitted by the employer is complete at step 306. Once the employer submits all the requested employer information, the outplacement tracking module 40 verifies the identity of the employer at step 308. The outplacement tracking module 40 may reference the submitted employer information using the verification service 150 as described earlier in the present disclosure. At step 312, if the verification service 150 indicates that the submitted employer information is accurate, the outplacement tracking module 40 may indicate to the employer that the registration request is approved, and will generate the employer data record for the employer and may further allow the employer to log in to the employment exchange 10. The employer intake process 300 is then complete and ends 316. The employer may then log in and begin using the employment exchange 10 as an on-boarder and/or off-boarder. If the submitted employer information is incorrect or cannot be verified, the outplacement tracking module 40 indicates to the employer that the submitted employer information is invalid. The intake process may end 316, or the outplacement tracking module 40 may request that the employer resubmit the requested employer information.

Figure 4A:
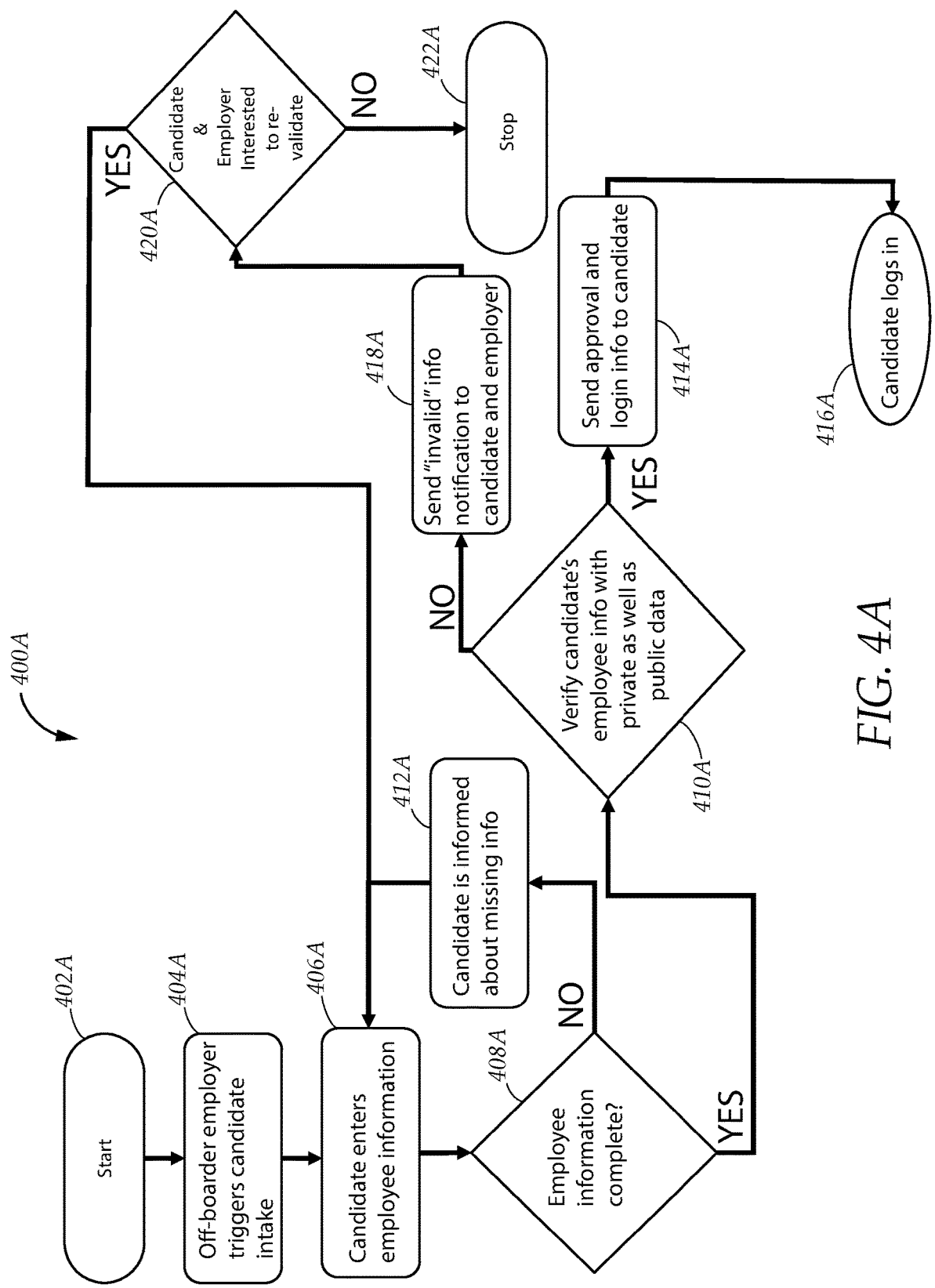
FIGS. 4A-B are block diagrams depicting the process flows for an exemplary employer triggered candidate intake process and an exemplary employee triggered candidate intake process respectively, in accordance with the present disclosure.

Turning to FIG. 4A while referring simultaneously to FIGS. 1A-B, 1D, and FIG. 2, the off-boarder 16 may register its employees using an exemplary employer triggered candidate intake process 400A. The employer triggered candidate intake process 400A begins at step 402A when an employer logs in to the employee exchange 10 and chooses to act as an off-boarder. At step 402A, the off-boarder 16 may submit employee information for one or more of its employees whose employment has either been terminated, or will be terminated. The names of such employees may be recorded by the outplacement tracking module 40 within the employer data record 27 of the off-boarder within an off-boarding employee list stored as an employer information item 27B. At step 404A, the off-boarder 16 may then submit a candidate registration request for any of the employees stored within the off-boarding employee list. Alternatively, the employment exchange 10 may contact each such employee and invite the employee to submit a candidate registration request. At step 406A, the outplacement tracking module requests employee information for each candidate, to be utilized to verify the identity of each candidate. The requested employee information may comprise a combination of the candidate's name, date of birth, Social Security Number, address, or other personally identifiable information. The requested employee information for each candidate may be submitted by the off-boarder or the candidate through the portal 138 or via the client application. Furthermore, each candidate's requested employee information may be retrieved by the employment exchange 10 from the off-boarder HRIS 17 via database query. The off-boarder HRIS 17 may be configured to allow the employment exchange 10 to access the employment information for any candidate stored within the off-boarding employees list of the off-boarder 16. At step 408A, the outplacement tracking module 40 determines if the requested employee information for each candidate is complete. If the requested employee information is complete, the employer triggered candidate intake process 400A may continue to step 410A, and the identity of each candidate is verified using the verification service 150, by comparing the submitted employment information with public records for each candidate. The verification service 150 may be a governmental or private service which can electronically verify the name, SSN, or other employee information for each candidate. If the identity of the candidate is successfully verified, the outplacement tracking module 40 may, at step 414A, indicate to the candidate that the candidate registration request is approved, and will generate the candidate data record 23 for the candidate and may further allow the candidate to log in to the employment exchange 10. Once the candidate logs in to the employment exchange, the employer triggered candidate intake process 400A concludes at step 416A. If the identity of the candidate cannot be successfully verified, the outplacement tracking module may indicate to the candidate and/or the off-boarder 16 that the submitted employee information is invalid at step 418A, and the off-boarder 16 and/or the candidate may be given the opportunity to resubmit the requested employee information for revalidation at step 420A. If the opportunity to resubmit the requested employee information is declined, the process ends at step 422A.

Figure 4B:
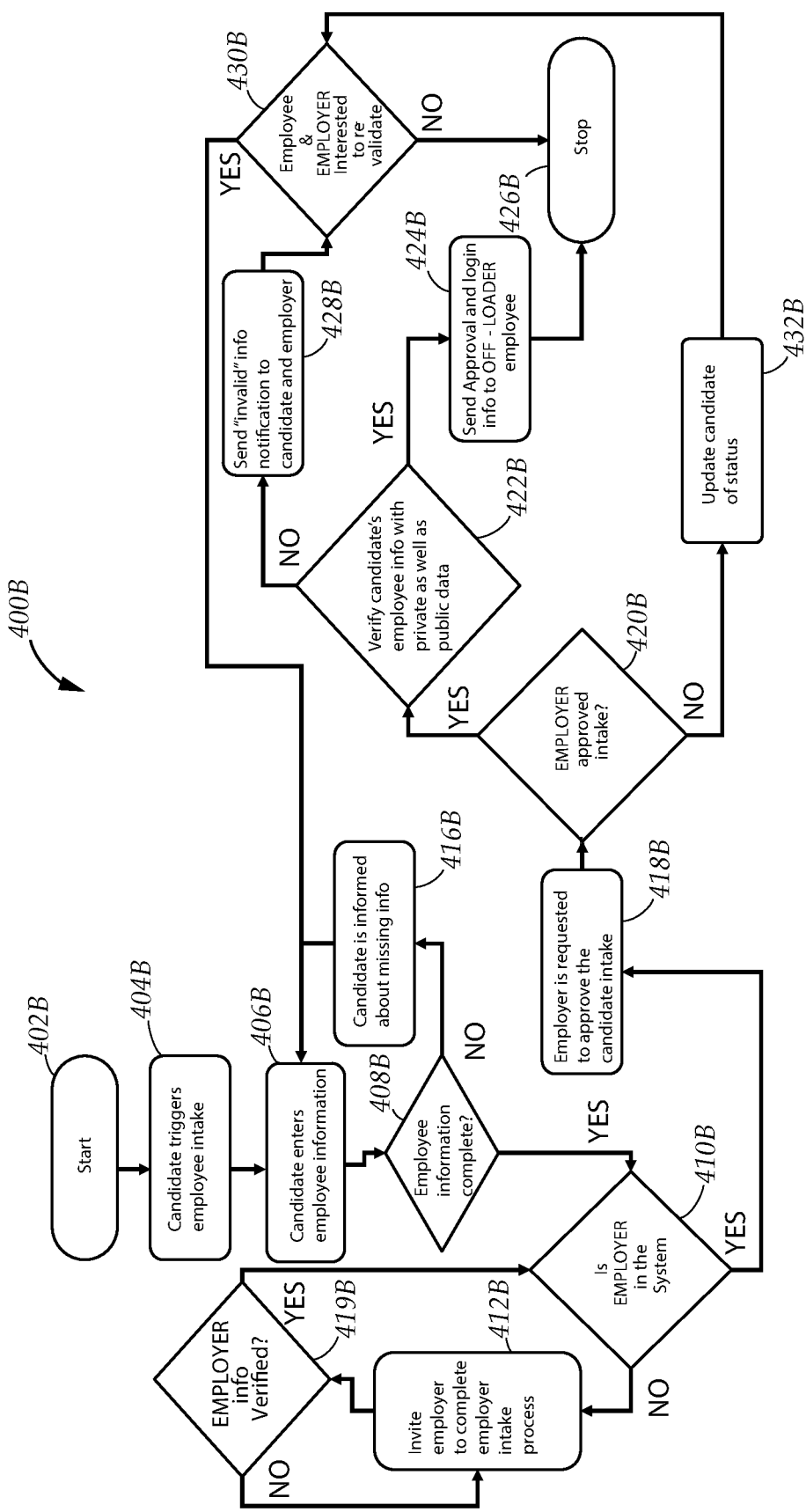

Referring now to FIG. 4B, while continuing to refer to FIGS. 1A-B, 1D, 2, and 4A, a candidate may initiate an employee triggered candidate intake process 400B which is similar to the employer triggered candidate intake process 400A. Here, the candidate may instead access the employment exchange 10 at step 402B and submit a candidate registration request independently of the candidate's employer at step 404B. The candidate must identify an off-boarder who has, or will, terminate the candidate's employment, by providing employer information identifying the off-boarder such as the name of the employer and the address. The outplacement tracking module 40 then requests employee information from the candidate at step 406B and checks the submitted employee information for completeness at step 408B. The outplacement tracking module 40 then checks whether the off-boarder identified by the candidate is present within the employer database 26 at step 410B, such as by checking the employer information provided by the candidate against the employer data records within the employer database 26. If the off-boarder identified by the candidate is already present in the employer database 26, the outplacement tracking module 40 may submit the candidate's employee information to the off-boarder so that the off-boarder may confirm whether the candidate is an employee of the off-boarder at step 418B. However, if the off-boarder identified by the candidate is not present in the employer database 26, the outplacement tracking module 40 may, at steps 412B and 414B, initiate the employer intake process as described in FIG. 3 so that the off-boarder may register with the employment exchange 10. At step 420B, the off-boarder may approve the employee triggered candidate intake if the candidate is an employee of the off-boarder, or reject the intake if the candidate is not an employee of the off-boarder or if the candidate's employee information is incorrect. The outplacement tracking module 40 may also be configured to obtain the candidate's employee information from the off-boarder HRIS via database query, or otherwise request that the off-boarder HRIS confirm whether the candidate's employee information can be found within the off-boarder HR data store. If the off-boarder approves the employee triggered candidate intake process, or if the outplacement tracking module 40 determines that the candidate is an employee of the off-boarder, the verification of the identity of the candidate begins at step 422B, and upon successful verification of the candidate's identity, the candidate registration request of the candidate will be approved at step 424B, prompting the employment exchange 10 to create the candidate data record 27 for the candidate and allow the candidate to log in to the employment exchange. If the off-boarder rejects the employee triggered candidate intake or the outplacement tracking module determines that the candidate's employee information cannot be found within the off-boarder HR data store, the candidate is informed that the employee information submitted by the candidate is invalid at step 432B. The candidate may be given the opportunity to resubmit the requested employee information for revalidation at step 430B. Likewise, the candidate may resubmit the requested employee information at step 430B, if the off-boarder approves the intake process at step 420B but the candidate's employee information cannot be verified successfully at step 422B. If the opportunity to resubmit the requested employee information is declined, the employee triggered candidate process ends at step 426B.

Figure 5:
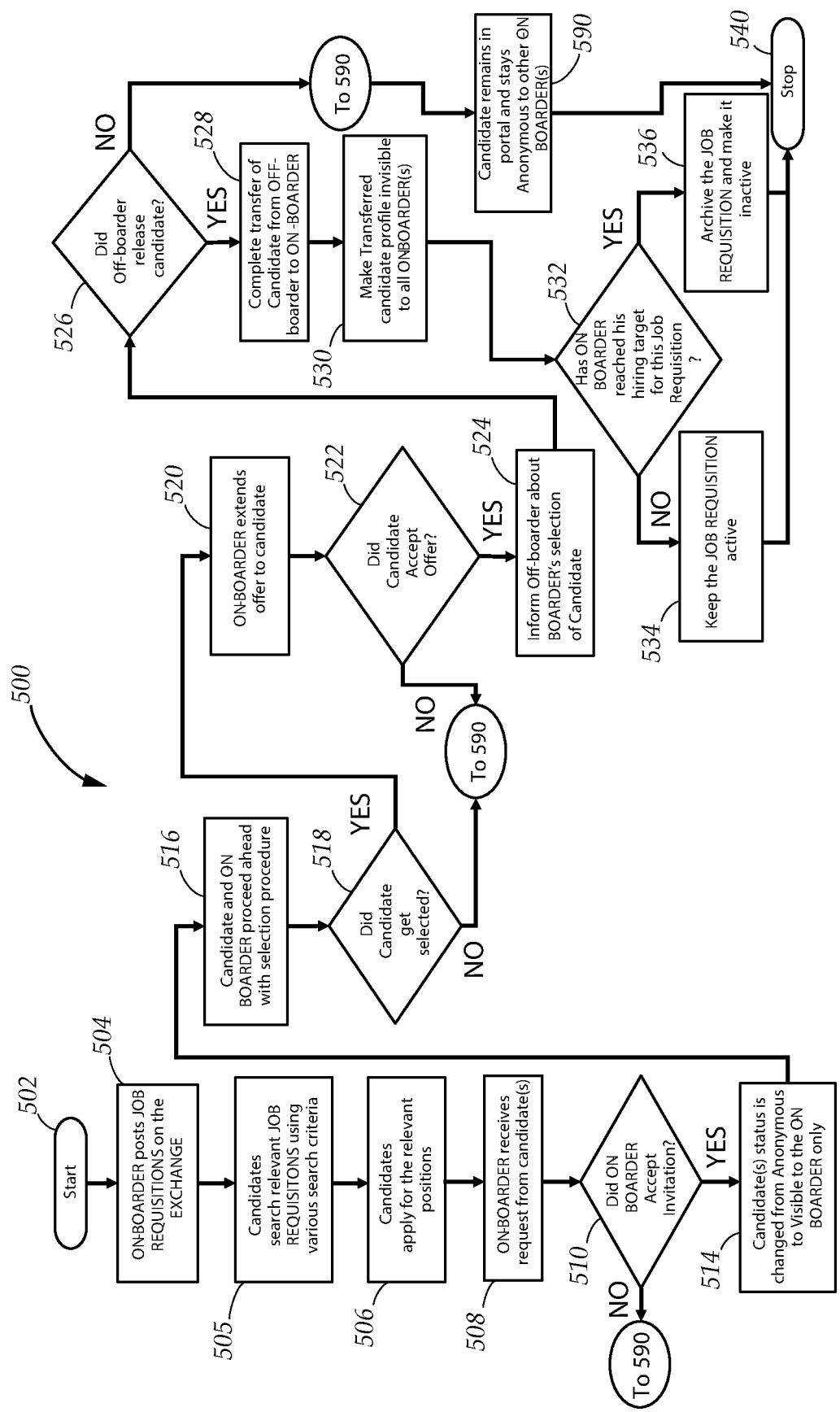
FIG. 5 is a block diagram depicting the process flow for an exemplary job requisition application and placement process, in accordance with the present disclosure.

Turning now to FIG. 5, while simultaneously referring to FIGS. 1A-B, 1D, and 2, once the candidates, off-boarders, and on-boarders are registered with the employment exchange 10, an on-boarder 18 may place a job requisition submission for a job requisition, and the candidate 14 may search for and submit a job requisition application to the job requisition, via a job requisition application and placement process 500. The on-boarder 18 may prepare the job requisition application at step 502 by accessing the employment exchange 10 via the portal 138, the client application, or the employment exchange HRIS module 140. The on-boarder 18 may further provide job information items which will be used to populate the job requisition data record, such as the job requisition parameters and the hiring target. The on-boarder 18 may then place the job requisition submission to the employment exchange 10, which is then received and processed by the requirement tracking module 60 at step 504. The on-boarder 18 may further submit the job requisition directly using the employment exchange HRIS module 140, such as by retrieving and submitting to the employment exchange 10 a job requisition posted on an internal job board of the on-boarder. The requirement tracking module 60 creates the job requisition data record 25 for the job requisition and populates the job requisition data fields 25A with the supplied job information items 25B. The requirement tracking module 60 may also define an on-boarder ID identifying the on-boarder 18 who submitted the job requisition, and may further define the job requisition ID, as job information items 25B. The requirement tracking module 60 may further indicate that the job requisition is available, allowing the job requisition data record 25 to be viewed by the candidate 14. The job requisition records 25 are indexed within the job requisition database 24 according to the job requisition parameters, allowing the candidate to submit a job requisition search request at step 505 to view all available job requisitions, or only those job requisitions matching selected job requisition parameters. For example, the candidate 14 may search for job requisitions having job requisition parameters matching the candidate's experience level, desired pay, and geographic location, as well as other job related selection criteria.

The requirement tracking module 60 processes the candidate's job requisition search request and presents the candidate 14 with a list of job requisitions, filtered according to the selected job requisition parameters where appropriate. The candidate 14 may submit a job requisition application for a job requisition at step 506, and the requirement tracking module 60 then delivers the job requisition application to the on-boarder 18 at step 508. The candidate's 14 visibility attribute may be set to anonymous by default, allowing the on-boarder to view portions of the candidate's profile data which do not reveal the identity of the candidate. After reviewing the candidate's profile data at step 510, the on-boarder 18 may either choose to be placed in contact with the candidate 14, or reject the job requisition application of the candidate 14. If the on-boarder 18 chooses to reject the job requisition application, the process 500 proceeds to step 590 and the visibility attribute of the candidate 14 may return to anonymous, or remain selectively visible to the on-boarder 18. However, if the on-boarder 18 chooses to be placed in contact with the candidate 14, the visibility attribute of the candidate 14 may be set to selectively visible, allowing the profile data of the candidate 14 to become viewable only by the on-boarder 18. For example, the candidate's full resume and contact information may become visible to the on-boarder 18. At step 516, a selection procedure begins, allowing the on-boarder 18 to communicate with a selection pool comprising each candidate with whom the on-boarder 18 chooses to be placed in contact with regarding the job requisition. At step 518, the on-boarder 18 may opt to select the candidate 14, or any other candidate who may be present within the selection pool to whom a placement offer is extended for the job requisition. The placement tracking module 80 may then generate a placement offer record 29 for the job requisition, and the placement tracking module 80 informs the selected candidate 14 of the placement offer as well as any conditions relating to the placement offer which may be set by the on-boarder 18, at step 520. The placement offer record 29 can further have one or more placement offer data fields 29A containing placement offer information identifying the on-boarder 18, the candidate 14, and the job requisition.

If the candidate 14 is not selected, or if the candidate rejects the placement offer, the process 500 may then proceed to step 590 and the visibility attribute of the candidate may be set to anonymous. The visibility attribute may remain selectively visible to the on-boarder 18, thus allowing the candidate 14 and the on-boarder 18 to remain in contact and resume the selection procedure if desired. If the candidate 14 accepts the placement offer, a transfer procedure begins, and the placement tracking module 80 may set the placement status of the placement offer to indicate the candidate's acceptance, and will then inform the off-boarder 16 of the candidate's acceptance of the placement offer at step 524. The placement tracking module 80 may then determine whether the off-boarder 16 releases the candidate 14, completing the termination of the candidate's employment. The placement tracking module 80 may submit a database query to the off-boarder HRIS 17 to determine whether the candidate 14 has been released, or may request that the off-boarder 16 confirm the release via the portal 138 or the client application. The placement tracking module 80 may further update the placement status to reflect whether the candidate is released by the off-boarder 16. The off-boarder 16 may be given an opportunity to cancel the termination of the candidate's employment at step 526, and the candidate 14 may have the opportunity to likewise cancel the candidate's acceptance of the placement offer in order to remain in the employment of the off-boarder 16. If the candidate 14 remains employed with the off-boarder 16, the placement tracking module may set the placement status to unsuccessful, and the process 500 proceeds to step 590, as described above.

Once the off-boarder 16 releases the candidate 14, the on-boarder 18 may complete the transfer procedure by hiring the candidate 14 at step 528. The placement tracking module 80 may submit a database query to the on-boarder HRIS 19 to determine whether the candidate 14 has been hired, or may request that the on-boarder 18 confirm the candidate's hiring via the portal 138 or the client application. The placement tracking module 80 may then set the placement status of the job requisition to successful. The placement tracking module 80 may set the visibility attribute of the candidate 14 to invisible at step 530, and may further adjust the candidate data record to show that the candidate is no longer available for employment. The placement tracking module 80 may then adjust the hiring target of the job requisition to reflect the hiring of the candidate at step 532. If the total number of candidates hired for the job requisition equals the hiring target, the placement tracking module 80 may set the job requisition to an inactive state at step 536, thus preventing any further job requisition applications from being submitted for the job requisition.

Figure 6:
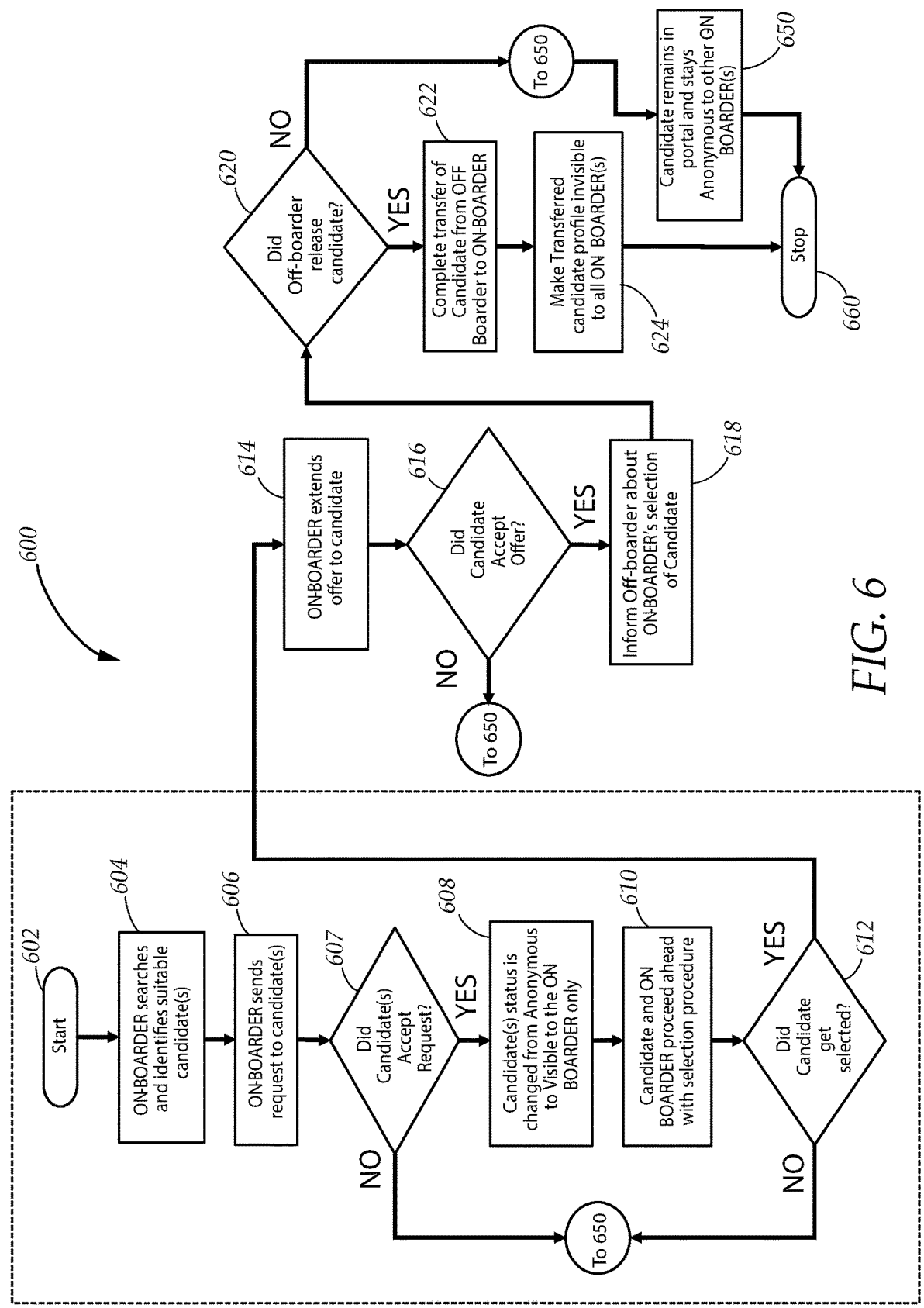
FIG. 6 is a block diagram depicting the process flow for an exemplary job requisition invitation and placement process, in accordance with the present disclosure.

Turning now to FIG. 6, while simultaneously referring to FIGS. 1A-B, 1D, and FIG. 2, the on-boarder 18 may search the candidate database 22 for candidates to fill the on-boarder's job requisition, via a job requisition request and placement process 600 which is similar to the job requisition submission and placement process 500 depicted in FIG. 5, except that the on-boarder 18 may search for and extend a job requisition request to a candidate. The on-boarder 18 may prepare a new job requisition or select an existing job requisition at step 602 in order to submit the job requisition request. The on-boarder 18 may then submit a candidate search request to the requisition tracking module 60 at step 604. The candidate search request may specify candidate profile data items, such as minimum experience and qualifications, a specific geographic area, or other employee information items, which will be used by the requirement tracking module 60 to filter the results of the candidate search. The requirement tracking module 60 then presents the on-boarder 18 with a list of candidates, which can be filtered to include only candidates whose profile data include the specified candidate profile data items, where appropriate. The on-boarder 18 may send a job requisition request to any candidate within the list of candidates at step 606, and each candidate who accepts the job requisition request at step 607 may be placed in contact with the on-boarder 18 and become selectively visible to the on-boarder 18 at step 608. The selection procedure then begins at step 610, and may be conducted in a manner similar to the selection procedure described in FIG. 5, except that the selection pool comprises each candidate who chooses to accept the on-boarder's job requisition request. The on-boarder 18 may choose to select any candidate within the selection pool at step 612, to whom a placement offer is extended at step 614. If the selected candidate accepts the placement offer at step 616, the transfer procedure begins and is conducted in a manner similar to the transfer procedure described in FIG. 5. Steps 618, 620, 622, and 624 are therefore substantially equivalent to steps 524 through 530. The placement tracking module 80 then oversees the transfer procedure to its completion at step 660.

It is noted that the processes described in FIGS. 3-6 are not intended to be limiting, and the steps within each process may be varied or omitted while adhering to the principles of the present disclosure, as will be apparent to a person of ordinary skill in the art in the field of the invention.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented an employment exchange for facilitating exchanges of verified employment candidates between off-boarding employers and on-boarding employers. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for facilitating the transfer of employment of one or more off-boarded employees from an off-boarding employer to an on-boarding employer, comprising the steps of:

providing an employment exchange comprising:
a control server operably connected to a network, the control server having an outplacement tracking module, a requirement tracking module, a placement tracking module, and a computer storage device;
an employment exchange database stored via the computer storage device; and
a plurality of user terminals operably connected to the control server via the network;
initiating an employer intake by the off-boarding employer, and registering the off-boarding employer as a verified off-boarder with the employment exchange database;
creating, by the outplacement tracking module, an employer data record associated with the verified off-boarder, the employer data record being indexed to an employer database of the employer exchange database;
storing a list of employees off-boarded by the verified off-boarding employer within the employment exchange database;
initiating a candidate intake by at least one candidate from a plurality of candidates, verifying each candidate by the outplacement module, by matching the candidate to one of the off-boarded employees within the list submitted by the off-boarding employer stored in the employment exchange database, registering each candidate with the employment exchange database as a verified candidate and creating a candidate data record for the verified candidate that is indexed to a candidate database stored on the employment exchange database, whereby the candidate data record indicates the verified candidate is available for employment;
creating a list of verified candidates by the requirement tracking module containing the verified candidates who are available for employment;
storing the list of verified candidates in the candidate database;
receiving a registration request from an on-boarder;
generating, by the outplacement tracking modules, an employer data record for the on-boarder, the on-boarder employer data record being indexed to the employer database;
creating a job requisition data record for a job requisition by the on-boarder via the requirements tracking module, the job requisition data record corresponding to one or more job openings, the job requisition data record including a hiring target corresponding to the number of job openings associated with the job requisition, and storing the job requisition data record within a job requisition list indexed to a job requisition database stored at the employment exchange database;
searching the job requisition list in the job requisition database by one of the verified candidates in the candidate database via the requirements tracking module, selecting the job requisition and submitting a job requisition application by the candidate via the requirement tracking module;
selecting at least one of the verified candidates to send a placement offer to the selected candidate by the on-boarding employer;
creating, via the placement tracking module, a placement offer record associated with a placement offer that is indexed to a placement database stored on the employment exchange database;
accepting the placement offer by the selected candidate;
hiring the selected candidate by the on-boarding employer;
tracking the placement offer record in the placement database and determining if a placement condition is met by the placement tracking module; and if the placement condition is met, adjusting the candidate data record in the candidate database of the hired candidate by the placement tracking module to
indicate the hired candidate is unavailable for employment,
prevent the selected candidate from submitting another job requisition application,
check if the number of hired candidates equals the hiring target by the placement tracking module, and
prevent further job requisition applications and job requisition requests from being submitted for the job requisition once the hiring target is reached.

2. The method as described in claim 1, wherein:
the step of searching the job requisition list by the candidate is followed by the steps of:
submitting a candidate search request to the requirement tracking module by the on-boarding employer and searching the list of candidates;
submitting a job requisition request associated with the job requisition to at least one candidate within the list of candidates via the requirement tracking module;
creating a selection pool for the job requisition containing the candidate associated with each job requisition application or job requisition request of the job requisition; and
the step of selecting the candidate further comprises selecting at least one of the candidates within the selection pool.

3. The method as described in claim 2, wherein the step of accepting the placement offer by the selected candidate is followed by the steps of:
notifying the off-boarding employer of the acceptance of the placement offer by the selected candidate; and
confirming the termination of the selected candidate's employment with the off-boarding employer using the placement tracking module.

4. The method as described in claim 1, wherein:
the employment exchange further comprises an off-boarder human resource information system operably connected to the control server via the network, the off-boarder human resource information system containing employment data;
the step of initiating a candidate intake further comprises the steps of submitting employee information by the candidate, and verifying the employee information by the outplacement tracking module comparing the employee information with the employment data stored on the off-boarder human resource information system.

5. The method as described in claim 4, wherein the step of confirming the termination of the selected candidate's employment with the off-boarding employer further comprises confirming the termination of the selected candidate's employment with the off-boarding employer by using the placement tracking module to submit a query to the off-boarder human resource information system.

6. The method as described in claim 5, wherein:
the outplacement tracking module is adapted to communicate with an employer and employee verification service for validating employer information and employee information;
the step of initiating an employer intake further comprises the steps of submitting employer information by the off-boarding employer, validating the employer information by the outplacement tracking module using the employer and employee verification service; and
the step of initiating a candidate intake further comprises the step of validating the employee information by the outplacement tracking module using the employer and employee verification service.

7. The method as described in claim 6, wherein:
the employment exchange further comprises an on-boarder human resource information system operably connected to the control server via the network; and
the step of adjusting the candidate data record of the hired candidate is preceded by the step of confirming the hiring of the hired candidate by using the placement tracking module to submit a query to the on-boarder human resource information system.

8. An employment exchange, comprising:
a control server operably connected to a network, the control server having a computer storage device;
a plurality of users comprising at least one of a candidate, an on-boarding employer, and an off-boarding employer, each candidate is an employee off-boarded by one of the off-boarding employers;
a plurality of user terminals operably connected to the control server via the network and adapted to allow the users to access the employment exchange;
an employment exchange data repository stored on the control server, the employment exchange data repository comprising
an indexed candidate database containing a plurality of candidate data records associated with one of the off-boarded employees, the candidate data record of each candidate including an availability status indicating the candidate is available for employment,
an employer database containing a plurality of off-boarding employer profiles data records associated with one of the off-boarding employers, and
an indexed job requisition database comprising a plurality of job requisition records, each off-boarding employer profile contains a list of off-boarded employees of the off-boarding employer, each job requisition record is associated with a job requisition created by one of the on-boarding employers, and each job requisition record contains a hiring target indicating the maximum number of candidates who can be hired;
an outplacement tracking module implemented using the control server, the outplacement tracking module is adapted to verify each candidate by verifying the candidate is contained within the list of off-boarded employees of one of the off-boarding employers and create a candidate data record for the verified candidate that is indexed to the candidate database stored on the employment exchange database;
a requirement tracking module implemented using the control server, the requirement tracking module is adapted to allow each candidate to search for and select one of the job requisition records in the job requisition database and submit a job requisition application to the associated on-boarding employer;
a placement tracking module implemented using the control server, the placement tracking module is adapted to:
create a placement offer record associated with a placement offer that is indexed to a placement database stored on the employment exchange database to allow each on-boarding employer receiving the job requisition application of one of the candidates to submit a placement offer to the candidate and to hire the candidate upon the candidate's acceptance of the placement offer;
track the placement offer record in the placement database and determine if a placement condition is met by the placement tracking module; and if the placement condition is met, adjusting the candidate profile data record in the candidate database of the hired candidate by the placement tracking module to
indicate the hired candidate is unavailable for employment,
prevent the selected candidate from submitting another job requisition application, check if the number of hired candidates equals the hiring target by the placement tracking module, and prevent further job requisition applications or job requisition requests from being submitted for the job requisition once the hiring target is reached.

9. The employment exchange as described in claim 8, wherein:

the requirement tracking module is further adapted to allow each on-boarding employer to search for and select one of the candidates and submit a job requisition request to the candidate; and the placement tracking module is further adapted to allow the placement offer to be submitted to the candidate who received the job requisition request from the on-boarding employer.

10. The employment exchange as described in claim 9, wherein:

the control server is adapted to connect to a verification service via the network; and the outplacement tracking module is further adapted to receive employee information submitted by each candidate and employer information submitted by each off-boarding employer, and validate the employee information or the employer information via the verification service.

11. The employment exchange as described in claim 10, wherein:

the outplacement tracking module is further adapted to prevent access to the employment exchange by each candidate and each off-boarding employer whose employee information or employer information is not successfully validated.

12. The employment exchange as described in claim 11, wherein:

the outplacement tracking module is further adapted to communicate with an off-boarder human resource information system associated with each off-boarder employer, and verify the employee information of each candidate using employment data of the off-boarder employer with whom the candidate is associated.

13. The employment exchange as described in claim 12, wherein:

the placement tracking module is further adapted to communicate with the off-boarder human resource information system of the off-boarder employer associated with each candidate and confirm that the candidate's employment has been terminated by the off-boarder employer.

14. The employment exchange as described in claim 13, wherein:

the placement tracking module is further adapted to communicate with an on-boarder human resource information system of the on-boarder employer who has submitted the placement offer to one of the candidates and confirm that the candidate has been hired by the on-boarder employer.

15. The employment exchange as described in claim 14, wherein:

the placement tracking module is further adapted to adjust the availability status of the candidate who has accepted the placement offer to indicate the candidate is unavailable for employment by, preventing the candidate from receiving additional job requisition requests.

16. The method as described in claim 1, wherein:

the candidate data record comprises a visibility attribute, and the step of adjusting the candidate data record of the hired candidate comprises changing the visibility attribute of the candidate data record.

17. The employment exchange as described in claim 8, wherein:

the candidate data record comprises a visibility attribute, and the placement tracking module is further adapted to adjusting the candidate data record of the hired candidate by changing the visibility attribute of the candidate data record.

\* \* \* \* \*